United States Patent [19]
Kondo

[11] Patent Number: 5,861,819
[45] Date of Patent: Jan. 19, 1999

[54] RADIO RECEIVER WITH SWITCHED A-D CONVERTER

[75] Inventor: Hisashi Kondo, Shizuoka, Japan

[73] Assignee: NEC Corporation, Tokyo, Japan

[21] Appl. No.: 767,621

[22] Filed: Dec. 17, 1996

[30] Foreign Application Priority Data

Dec. 19, 1995 [JP] Japan .................................. 7-330174

[51] Int. Cl.⁶ .................................................... H04Q 7/14

[52] U.S. Cl. ........................................................ 340/825.44

[58] Field of Search .................... 340/825.44, 825.48, 340/825.56, 311.1; 455/31.2, 38.2, 38.4, 38.5; 345/173; 178/18–20, 87; 395/358; 382/313, 315

[56] References Cited

U.S. PATENT DOCUMENTS 4,644,352  2/1987  Fujii .................................... 340/825.44
5,184,120  2/1993  Schultz ............................... 340/870.39

*Primary Examiner*—Edwin C. Holloway, III
*Attorney, Agent, or Firm*—Young & Thompson

[57] ABSTRACT

A radio receiver includes an input device for producing an analog input signal and a receiver for receiving a radio signal to produce an analog received signal. A first switch selects the analog input signal and the analog receiver signal alternately to output a selected analog signal to an A-D converter, and a second switch divides the output of the A-D converter into a digital input signal and a digital received signal. A processor processes the digital received signal and the digital input signal and performs an operation determined based on the digital input signal.

14 Claims, 2 Drawing Sheets

RADIO RECEIVER WITH SWITCHED A-D CONVERTER

BACKGROUND OF THE INVENTION

1. Field of the Invention

The present invention generally relates to radio receivers including a selective call receiver and a mobile terminal and, in particular, to a radio receiver having an analog-to-digital (A-D) converter which is used to convert a received signal from analog to digital.

2. Description of the Related Art

A selective call receiver has been widely used for various purposes and, especially, a small-sized and lightweight selective call receiver, or a pager, is suitable for being taken on the road. A basic function of the selective call receiver is to indicate by beep sound, vibration, or light the incoming call and then to inform the user of a received message, for example, displaying the received message on a liquid-crystal display (LCD) according to user's key operations.

In general, the selective call receiver is provided with several keys for inputting user's instructions such as stopping a beep, selecting a message, and deleting the message. Such a key is formed with, for example, a push button or a slide switch.

It is also known that a touch-sensitive pad, a touch-sensitive panel, or a touch-sensitive screen is widely used to determine the location of a touch on a display. Therefore, such a touch-sensitive pointing device may be used as an input device of the selective call receiver instead of the above operation keys.

In view of a selective call receiver, the touch-sensitive pointing device preferably employs the simplest structure having a pair of transparent electrodes so as to sense the X-Y location of a touch, and a voltage is alternately applied to X and Y sensing lines. The X-Y sense output voltages of the touch-sensitive pointing device are digitized by an A-D converter and the digital output signal is used to determine the location of a touch by a touch location detector.

However, the touch sensing operation and the A-D conversion of the touch-sensitive pointing device cause noises which adversely affect not only the receiving sensitivity but also the quality of received signals.

Further, in addition to an A-D converter for received signals, another A-D converter for the touch sense signal is needed, which results in increased necessary space and power consumption.

SUMMARY OF THE INVENTION

An object of the present invention is to provide a selective call receiver having an input device requiring electrical processing without deteriorating the receiving sensitivity or the quality of received signals.

Another object of the present invention is to provide a selective call receiver having the input device, which saves space and power consumption.

Still another object of the present invention is to provide a selective call receiver having a touch-sensitive panel, which prevents the receiving sensitivity and the quality of received signals from reducing and further saves space and power consumption.

According to the present invention, an A-D converter is used to alternately digitize a received signal and an instruction input signal. In other words, a single A-D converter is shared between a signal receiving process and an instruction performing process.

According to an aspect of the present invention, the radio receiver includes an input device for inputting an instruction to produce an analog input signal and a receiver for receiving a radio signal to produce an analog received signal. The radio receiver is further provided with a single A-D converter. A selector selects the analog input signal and the analog received signal alternately to output a selected analog signal to the A-D converter, and a divider divides a digital output signal of the A-D converter into a digital input signal and a digital received signal. A processor processes the digital received signal and performs an operation corresponding to the instruction determined based on the digital input signal.

Preferably, the radio receiver is comprised of an input controller which controls the input device. The input device produces the analog input signal corresponding to the instruction and is stopped operating when the selector selects the analog received signal. Further preferably, the selector selects the analog received signal until the analog received signal has been received after an incoming call.

According to another aspect of the present invention, a selective call receiver includes an input device for sensing a touch to produce an analog input signal and a receiver for receiving a radio signal to produce an analog received signal. The selective call receiver is further comprised of a first switch, an A-D converter, and a second switch. The first switch and the second switch perform switching between a first state and a second state according to a switching control signal. The first switch selects the analog input signal and the analog received signal alternately to produce a selected analog signal. The A-D converter digitizes the selected analog signal to produce a digital selected signal. The second switch produces a digital input signal and a digital received signal from the digital selected signal. After the digital input signal is translated to a location of the touch on the input device, an incoming call is detected based on the digital received signal and an operation corresponding to the location of the touch is performed.

As described above, since a single A-D converter is shared between a signal receiving process and an instruction performing process, the reduced space for placing A-D converters and the reduced power consumption are both achieved.

Further, since the input device is stopped when the selector or the first switch selects the analog received signal, noises due to the operation of the input device are not produced. Therefore, the input device does not affect the receiving sensitivity and the quality of received signals.

DETAILED DESCRIPTION OF THE PREFERRED EMBODIMENT

Figure 1:
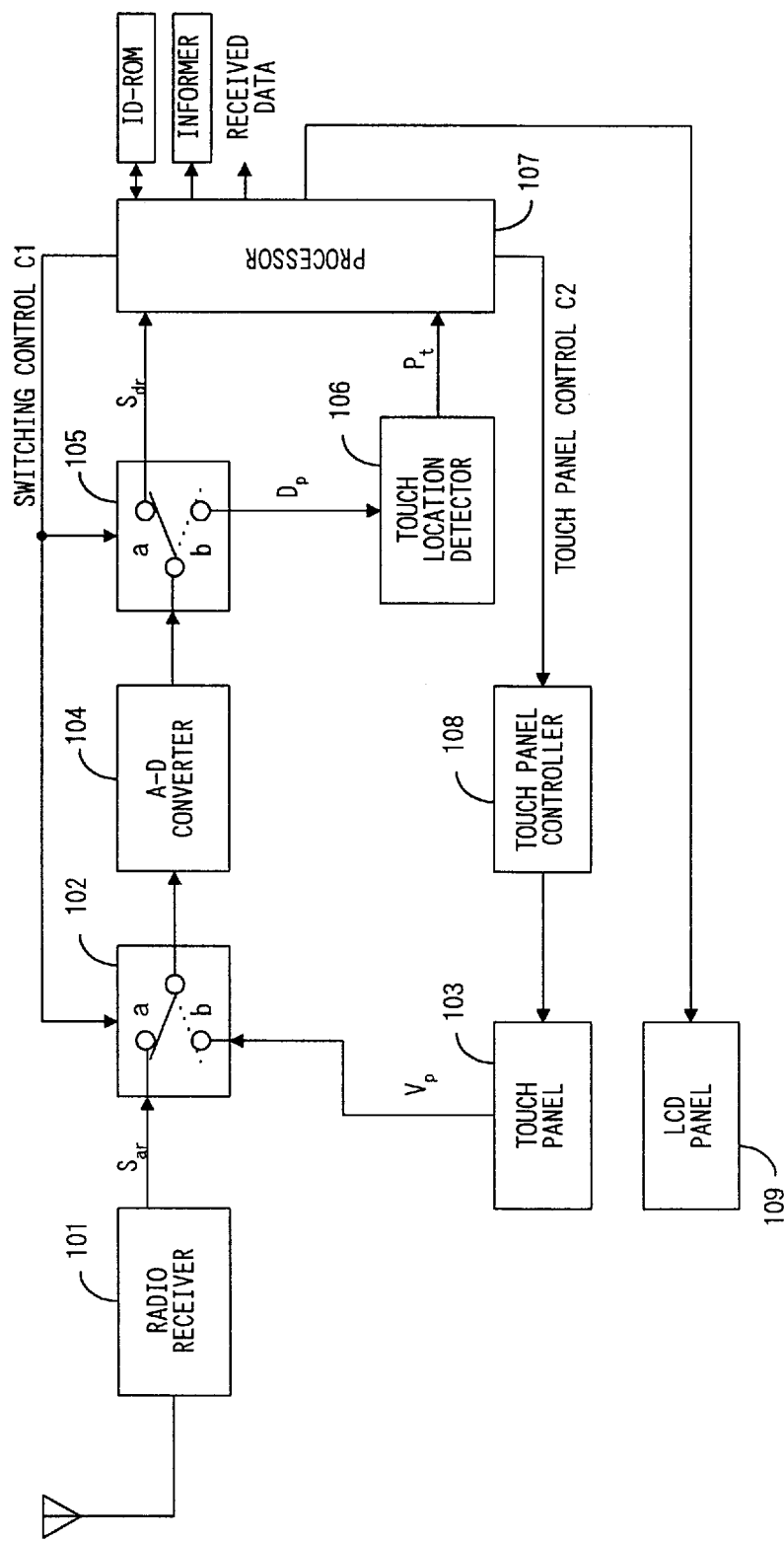
FIG. 1 is a block diagram showing a radio selective call receiver according to an embodiment of the present invention.

Referring to FIG. 1, there is shown a selective call receiver in accordance with the present invention. An antenna is connected to a radio receiver 101 which receives a radio selective calling signal from a radio base station (not shown) through the antenna and demodulates it into a baseband selective calling signal $S_{ar}$. A switch 102 selects one of the baseband selective calling signal $S_{ar}$ and a sense output signal $V_p$ of a touch panel (or a touch screen) 103 to output the selected one to an A-D converter 104. The output of the A-D converter 104 is transferred to a selected one of a touch location detector 106 and a processor 107 by a switch 105. The touch location detector 106 detects the location of a touch on the surface of the touch panel 103 based on a digital sense signal $D_p$ which is received from the switch 105.

The processor 107 receives the digital baseband selective calling signal $S_{dr}$ from the switch 105 to perform predetermined operations including decoding of the signal $S_{dr}$, detection of a call occurrence, and informing. The processor 107 further receives the touch location data $P_T$ from the touch location detector 106 and performs a processing operation specified by the location of the user's touch, for example, beep stopping and message displaying. The processor 107 supplies a switching control signal C1 to both the switches 102 and 105 to control the switching operation, and further supplies a touch panel control signal C2 to a touch panel controller 108 which controls the touch panel 103. The touch panel 103 is provided on an LCD panel 109 which displays key graphic images, messages, and other necessary information under the control of the processor 107. As described later, the processor 107 can stop and restart the touch panel 103 operating.

It should be noted that the switch 105 and the touch location detector 106 may be formed with a program-controlled processor.

The switch 102 has two input terminals and a single output terminal, where one input terminal is connected to the output of the radio receiver 101, the other input terminal is connected to the output of the touch panel 103, and the output terminal is connected to the input of the A-D converter 104. According to the switching control signal C1, the switch 102 switches between two states a and b. As described later, the switching operation is performed in a constant period at times other than when a calling signal is received. The switch state a makes a connection of the radio receiver 101 to the A-D converter 104 and the state b makes another connection of the touch panel 103 to the A-D converter 104.

The switch 105 has a single input terminal and two output terminals, where the input terminal is connected to the output of the A-D converter 104 and one output terminal is connected to the processor 107 and the other output terminal is connected to the touch location detector 106. According to the switching control signal C1, the switch 105 switches between two switching states a and b. Similarly to the switch 102, the switching operation is performed in the constant period at times other than when a calling signal is received. The state a makes a connection of the A-D converter 104 to the processor 107 and the state b makes another connection of the A-D converter 104 to the touch location detector 106.

The switches 102 and 105 concurrently receive the switching control signal C1 from the processor 107. Therefore, when the switches 102 and 105 are in the state a, the baseband selective calling signal $S_{ar}$ is digitized by the A-D converter 104 and the digital baseband selective calling signal $S_{dr}$ is transferred to the processor 107 through the switch 105. On the other hand, when the switches 102 and 105 are in the state b, the sense output signal $V_p$ of the touch panel 103 is digitized by the A-D converter 104 and the digital sense output signal $D_p$ is transferred to the touch location detector 106 through the switch 105, and then the processor 107 receives the touch location date $P_T$ from the touch location detector 106.

In this embodiment, the touch panel 103 is placed on the LDC panel 109. The touch panel 103 includes dot spacers and transparent electrodes spacing through the dot spacers. A driving voltage is applied to one of the transparent electrodes with alternating X and Y directions by the touch panel controller 108. More specifically, when the user touches the surface of the touch panel 103, the touch causes a change of X and Y output voltages depending on the location of a touch. Therefore, the touch location can be detected from the sense output signal $V_p$ comprising the X and Y output voltages of the touch panel 103. The processor 107 controls the LCD panel 109 so that a plurality of key images are displayed at predetermined positions on screen.

Figure 2:
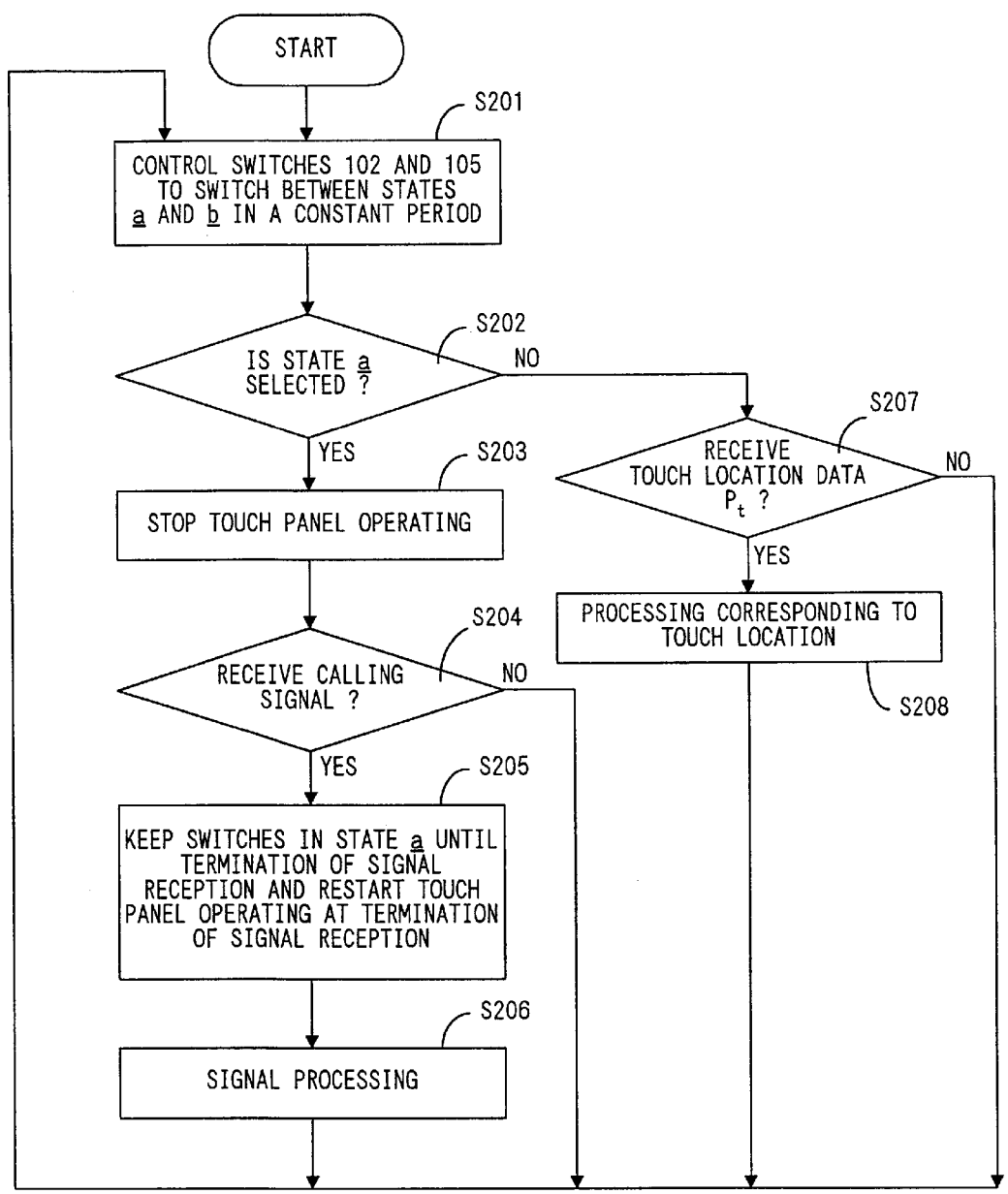
FIG. 2 is a flowchart showing an operation of the embodiment of FIG. 1.

As shown in FIG. 2, when power is turned on, the processor 107 outputs the switching control signal C1 to the switches 102 and 105 so that they switch between the states a and b in the constant period (step S201).

When the state a is selected in the switches 102 and 105 (YES in step S202), the processor 107 outputs the touch panel control signal C2 to the touch panel controller 108 to stop the touch panel 103 operating (step S203). When receiving the digital selective calling signal $S_{dr}$, the processor 107 checks whether an incoming call occurs by comparing a received calling number with a registered calling number which is previously stored in a memory (ID-ROM) (step S204). When an incoming call occurs (YES in step S204), the processor 107 keeps the switches 102 and 105 in the state a until the calling signal has been received and, after that, restarts the switches 102 and 105 switching and also the touch panel 103 operating (step S205). Further, after the calling signal has been received, the processor 107 performs the predetermined signal processing (step S206). For example, the processor 107 activates an informer such as a speaker or a vibrator to inform the user of the incoming call and then a received message is stored onto a message memory (not shown).

On the other hand, when the sate b is selected in the switches 102 and 105 (NO in step S202), the processor 107 checks whether touch location data $P_T$ is received from the touch location detector 106 (step S207). When the touch location data $P_T$ is received (YES in step S207), the processor 107 determines a processing operation depending on the location of a touch indicated by the touch location data $P_T$ (step S208). For example, in cases where the user touches a key image for stopping the beep sound, the processor 107 stops the informer operating. Further, when the user touches another key image for selecting and displaying the received message on screen, the processor 107 reads a selected message from the message memory and displays it on the LCD panel 109.

As described above, the A-D converter 104 is used to alternately digitize the received signal $S_{ar}$ and the sense output signal $V_p$ according to the switching operation of the switches 102 and 105. In other words, a single A-D converter is shared between the processing operation of a received signal and the location detecting operation of a user's touch. Therefore, the reduced space and power consumption are achieved.

Further, since the touch panel 103 is stopped when the switches 102 and 105 are in state a, noises due to the operation of the touch panel 103 are not produced. Therefore, the touch panel 103 does not affect the receiving sensitivity and the quality of received signals.

What is claimed is:

1. A radio receiver comprising:

input means for inputting an instruction to produce an analog input signal;

receiving means for receiving a radio signal to produce an analog received signal;

an analog-to-digital converter;

selecting means for selecting the analog input signal and the analog received signal alternately to output a selected analog signal to the analog-to-digital converter;

dividing means for dividing a digital output signal of the analog-to-digital converter into a digital input signal and a digital received signal in synchronization with the selecting means; and processing means for processing the digital received signal and performing an operation corresponding to the instruction determined based on the digital input signal.

2. The radio receiver according to claim 1, further comprising:

input control means for controlling the input means such that the input means produces the analog input signal corresponding to the instruction and the input means is stopped operating when the selecting means selects the analog received signal.

3. The radio receiver according to claim 1, wherein the processing means detects an incoming call based on the digital received signal and the selecting means selects the analog received signal until the analog received signal has been completely received.

4. The radio receiver according to claim 1, further comprising a display for displaying at least one predetermined key image according to control of the processing means, wherein the input means comprises a transparent touch-sensitive panel which is placed on the display to form a touch screen.

5. The radio receiver according to claim 2, further comprising a display for displaying at least one predetermined key image according to control of the processing means, wherein the input means comprises a transparent touch-sensitive panel which is placed on the display to form a touch screen.

6. A selective call receiver comprising:

input means for sensing a touch to produce an analog input signal;

receiving means for receiving a radio signal to produce an analog received signal;

first switching means for switching between a first state and a second state according to a switching control signal to select the analog signal and the analog received signal alternately to produce a selected analog signal;

an analog-to-digital converter for digitizing the selected analog signal to produce a digital selected signal;

second switching means for switching between the first state and the second state according to the switching control signal to produce a digital input signal and a digital received signal from the digital selected signal;

translating means for translating the digital input signal to a location of the touch on the input means; and processing means for detecting an incoming call based on the digital received signal and performing an operation corresponding to the location of the touch.

7. The selective cell receiver according to claim 6, further comprising:

input control means for controlling the input means such that the input means produces the analog input signal corresponding to the location of the touch and operation of the input means is stopped when the first switching means is in the first state to select the analog received signal.

8. The selective call receiver according to claim 6, wherein the first switching means selects the analog received signal until the analog received signal has been completely received.

9. The selective call receiver according to claim 6, further comprising a display for displaying at least one predetermined key image according to control of the processing means, wherein the input means comprises a transparent touch-sensitive panel which is placed on the display to form a touch screen.

10. The selective call receiver according to claim 7, further comprising a display for displaying at least one predetermined key image according to control of the processing means, wherein the input means comprises a transparent touch-sensitive panel which is placed on the display to form a touch screen.

11. A control method of a radio receiver comprising an analog-to-digital converter, comprising the steps of:

a) inputting an instruction to produce an analog input signal;

b) receiving a radio signal to produce an analog received signal;

c) selecting the analog input signal and the analog received signal in an alternating sequence to output a selected analog signal to the analog-to-digital converter;

d) dividing a digital output signal of the analog-to-digital converter into a digital input signal and a digital received signal in the alternating sequence; and e) performing a receiving operation based on the digital received signal and an operation corresponding to the instruction determined based on the digital input signal.

12. The control method according to claim 11, further comprising the step of:

stopping the step (a) when the analog received signal is selected.

13. The control method according to claim 11, further comprising the step of:

detecting an incoming call based on the digital received signal, wherein the step (c) is performed until the analog received signal has been received after the incoming call.

14. A control method of a radio receiver, comprising the steps of:

sensing a touch to produce an analog input signal;

receiving a radio signal to produce an analog received signal;

switching between a first state and a second state according to a switching control signal to select the analog output signal and the analog received signal alternately to produce a selected analog signal;

digitizing the selected analog signal to produce a digital selected signal;

switching between the first state and the second state according to the switching control signal to produce a digital input signal and a digital received signal from the digital selected signal;

translating the digital input signal to a location of the touch;

detecting an incoming call based on the digital received signal; and performing an operation corresponding to the location of the touch.

* * * * *